US005523663A

United States Patent [19]
Tsuge et al.

[11] Patent Number: 5,523,663
[45] Date of Patent: Jun. 4, 1996

[54] METHOD FOR CONTROLLING A MANIPULATOR RELATIVE TO A MOVING WORKPIECE

[75] Inventors: Hiroshi Tsuge, Handa; Mamoru Minami, Daito, both of Japan

[73] Assignee: Tsubakimoto Chain Co., Osaka, Japan

[21] Appl. No.: 58,732

[22] Filed: May 7, 1993

[30] Foreign Application Priority Data

May 15, 1992 [JP] Japan ................................ 4-148654

[51] Int. Cl.⁶ ................................................. B25J 19/02
[52] U.S. Cl. ........................... 318/568.16; 318/568.19; 901/38; 901/47
[58] Field of Search ............................ 318/560, 561.3, 318/565–566, 567, 568.1, 568.11, 568.12, 568.13, 568.15, 568.16, 568.17, 568.18, 568.19, 568.2, 568.21, 568.22, 568.24, 568.25, 569, 570–572, 600–602, 626, 640, 638, 652; 901/1–3, 6, 9, 14–16, 23, 28–29, 30–32, 38, 46–47, 49; 364/138, 148, 172–175, 221, 916, 221.1, 222, 237.3

[56] References Cited

U.S. PATENT DOCUMENTS

| | | | |
|---|---|---|---|
| 4,146,924 | 3/1979 | Birk et al. | 364/94 |
| 4,833,383 | 5/1989 | Skarr et al. | 318/568.16 |
| 4,941,106 | 7/1990 | Krieger | 318/568.16 X |
| 4,965,499 | 10/1990 | Taft et al. | 318/568.11 |
| 5,055,755 | 10/1991 | Ozawa et al. | 318/568.11 |
| 5,066,902 | 11/1991 | Watanabe | 318/568.16 |
| 5,159,249 | 10/1992 | Megherbi | 318/568.1 |
| 5,165,841 | 11/1992 | Asano et al. | 318/568.16 |

*Primary Examiner*—David S. Martin
*Attorney, Agent, or Firm*—Townsend and Townsend Khourie and Crew

[57] ABSTRACT

A method for real-time three-dimensional control of position and attitude of an end effector of a manipulator relative to a moving workpiece. Angles of revolute joints of the manipulator are controlled by harmonizing a first control methodology, wherein the z-axis coordinate of the end effector and the attitude of the end effector are controlled based on input target values for the position and attitude of the end effector, with a second control methodology, wherein the x-axis and y-axis coordinates of the end effector are controlled responsive to image data captured by a camera mounted to the manipulator.

4 Claims, 6 Drawing Sheets

METHOD FOR CONTROLLING A MANIPULATOR RELATIVE TO A MOVING WORKPIECE

BACKGROUND OF THE INVENTION

1. Field of the Invention

This invention relates to a method of controlling the position and attitude of an end effector of a manipulator that has revolute joints.

2. Description of the Related Art

Various types of industrial robots have been developed to improve productivity and assure safety in factories. One type of prior art mobile robot includes an articulated manipulator. The articulated manipulator has an end effector at one end and is mounted on an autonomous carriage. The mobile robot handles an object or workpiece with the manipulator by controlling the travel of the carriage and the position and attitude of the manipulator.

The mobile robot described above includes a CCD camera or equivalent attached to the end effector to capture an image of the workpiece. The position and attitude of the end effector of the manipulator are controlled based on image data obtained by the camera.

The mobile robot performs the necessary control function in the following manner. The position and attitude of the workpiece is first derived from image data captured by the camera. Next, the robot calculates a target angle of each revolute joint of the manipulator necessary to shift the position and attitude of the end effector to grasp the workpiece. Then, the robot proportionally controls the angle of each revolute joint to agree with the target angles and the end effector grasps the workpiece.

The control method described above assumes that the workpiece remains stationary. The prior art mobile robot cannot adjust the target angles of the revolute joints responsive to the relative movement of the workpiece and the carriage to which the robot is mounted.

SUMMARY OF THE INVENTION

The invention provides a method of controlling the position and attitude of an end effector of a manipulator responsive to the relative movement of a workpiece to be grasped.

The above and further objects and features of the invention will be more fully apparent from the following detailed description with accompanying drawings.

DESCRIPTION OF THE PREFERRED EMBODIMENT

Figure 1:
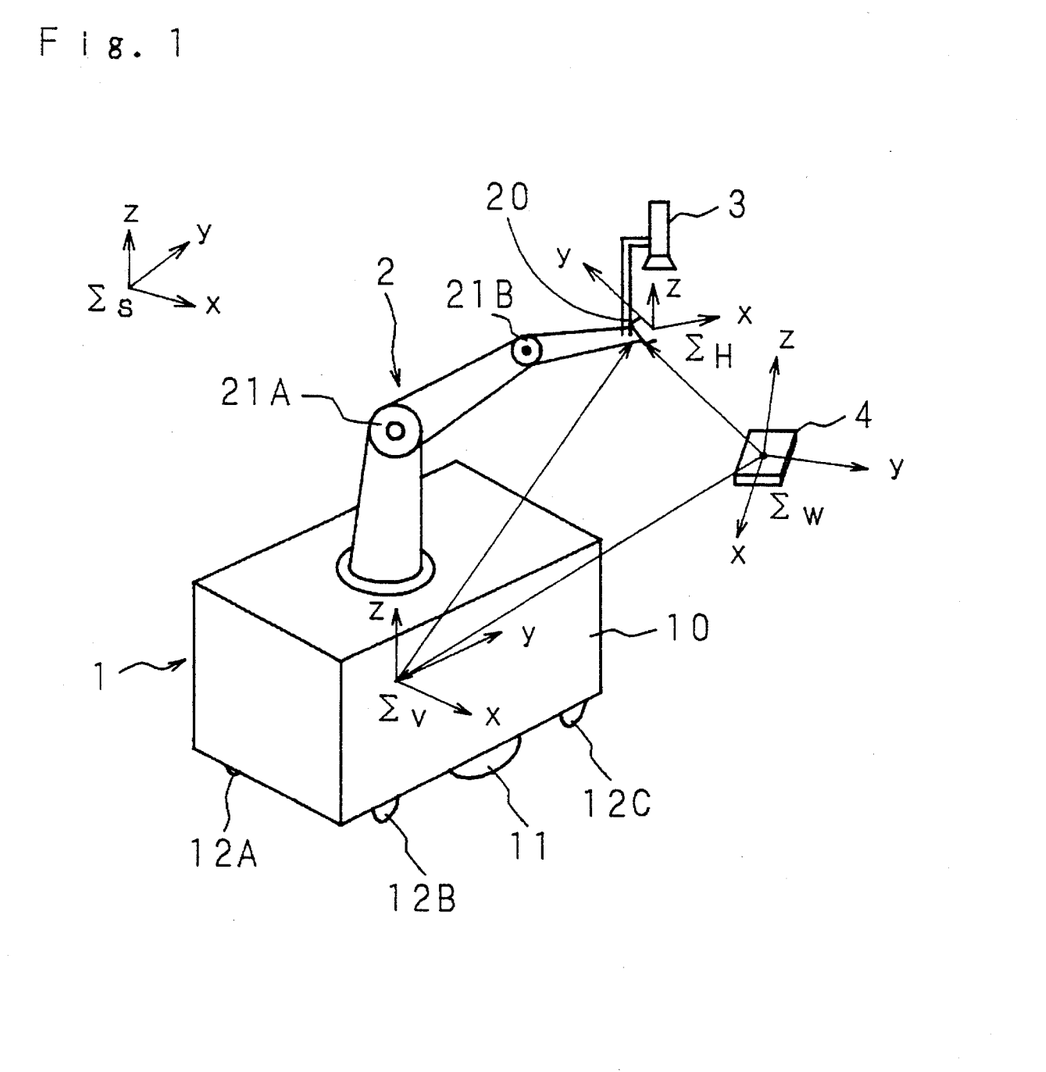
FIG. 1 is a perspective view of a mobile robot that employs the end effector control method of the invention.

A preferred embodiment of the invention will now be discussed with reference to the accompanying drawings. FIG. 1 is a perspective view of a mobile robot that employs the end effector control method of the invention.

The mobile robot includes a carriage 1 which is autonomous and includes a box-like body 10 supported by right and left driving wheels (only the right driving wheel 11 is depicted in the drawing) and by four casters (only three casters, 12A, 12B, and 12C are shown in the drawing). The driving wheels are independently driven by separate motors (not shown). An articulated manipulator 2 is mounted to body 10. The manipulator 10 has an end effector 20 and a plurality of rotary revolute joints (two revolute joints 21A and 21B are shown). A CCD camera 3 is provided for capturing an image of the end effector 20 and the vicinity thereof from above.

Each driving wheel is provided with a rotation speed detector with an incorporated pulse encoder (not shown) which generates pulses in accordance with the rotation of the wheel. An angle detector is provided for each of the revolute joints of the manipulator 2. In FIG. 1, $\Sigma_S$ represents an absolute coordinate system set at an arbitrary point independent of the carriage 1 and the manipulator 2 (e.g., an arbitrary point on the floor), $\Sigma_H$ indicates a hand-centered coordinate system set at the end effector 20 of the manipulator 2, $\Sigma_V$ is a moving coordinate system set at the carriage 1 and $\Sigma_W$ is a workpiece-centered coordinate system set at an object or workpiece 4. It is to be noted here that the description below assumes that the manipulator 2 has six degrees of freedom and six revolute joints, although only two revolute joints 21A and 21B are shown.

The relationship between the incremental rotations of the revolute joints of the manipulator 2, and the incremental translation and rotation of the end effector 20 relative to the moving coordinate system $\Sigma_V$ will now be discussed.

Assume that the revolute joints of the manipulator 2 are incrementally rotated, thus incrementally translating and rotating end effector 20 of the manipulator 2. The matrix showing the angle of the incremental rotation of each revolute joint of the manipulator 2 is represented by the expression (1). The incremental translation of the end effector 20 is represented by the expression (2) as an incremental translation vector seen from the moving coordinate system $\Sigma_V$, while the incremental rotation of the end effector 20 is represented by the expression (3) as an incremental rotation vector seen from the moving coordinate system $\Sigma_V$.

$$dq = [dq_1, dq_2, dq_3, dq_4, dq_5, dq_6]^T \quad (1)$$

where $dq$: angle of incremental rotation $dq_1$–$dq_6$: rotation angles of 1st through 6th revolute joints $$^v dr_{HP} = [^v dr_x, {}^v dr_y, {}^v dr_z]^T \quad (2)$$

where $^v dr_{HP}$: incremental translation vector $^v dr_x$: x-axis component of incremental translation vector
$^v dr_y$: y-axis component of incremental translation vector
$^v dr_z$: z-axis component of incremental translation vector $$^v dr_{HO} = [^v d_{\varphi 2}, {}^v d_\theta, {}^v d_\phi]^T \quad (3)$$

where $^v dr_{HO}$: incremental rotation vector $^vd_\rho$: x-axis component of incremental rotation vector
$^vd_\theta$: y-axis component of incremental rotation vector
$^vd_\phi$: z-axis component of incremental rotation vector The relationship between the matrix $q=[q_1, q_2, q_3, q_4, q_5, q_6]^T$ representing the angles of each of the revolute joints of the manipulator 2, and the position and attitude of the end effector 20 seen from the moving coordinate system $\Sigma_v$ is indicated by equation (4);

$$^vr_H = F(q) \qquad (4)$$

where $^vr_H$: vector of position and attitude of end effector from moving coordinate system
F: function determined by link mechanism When both sides of equation (4) are differentiated, the relationship between the time differentiated value of the position and attitude of the end effector 20 and the time differentiated value of the revolute joint angles is represented by the equation (5);

$$^v\dot{r}_H = {^vJ(q)}\dot{q} \qquad (5)$$

where $^v\dot{r}_H$: time differentiated value of $^vr_H$.
$^vJ(q)$: Jacobian matrix
$\dot{q}$: time differentiated value of a q The equation (5) may be changed into form (6) by applying expressions (1) and (3);

$$\begin{pmatrix} ^vdr_x \\ ^vdr_y \\ ^vdr_z \\ ^vd\rho \\ ^vd\theta \\ ^vd\phi \end{pmatrix} = {^vJ(q)} \begin{pmatrix} dq_1 \\ dq_2 \\ dq_3 \\ dq_4 \\ dq_5 \\ dq_6 \end{pmatrix} \qquad (6)$$

Figure 2:
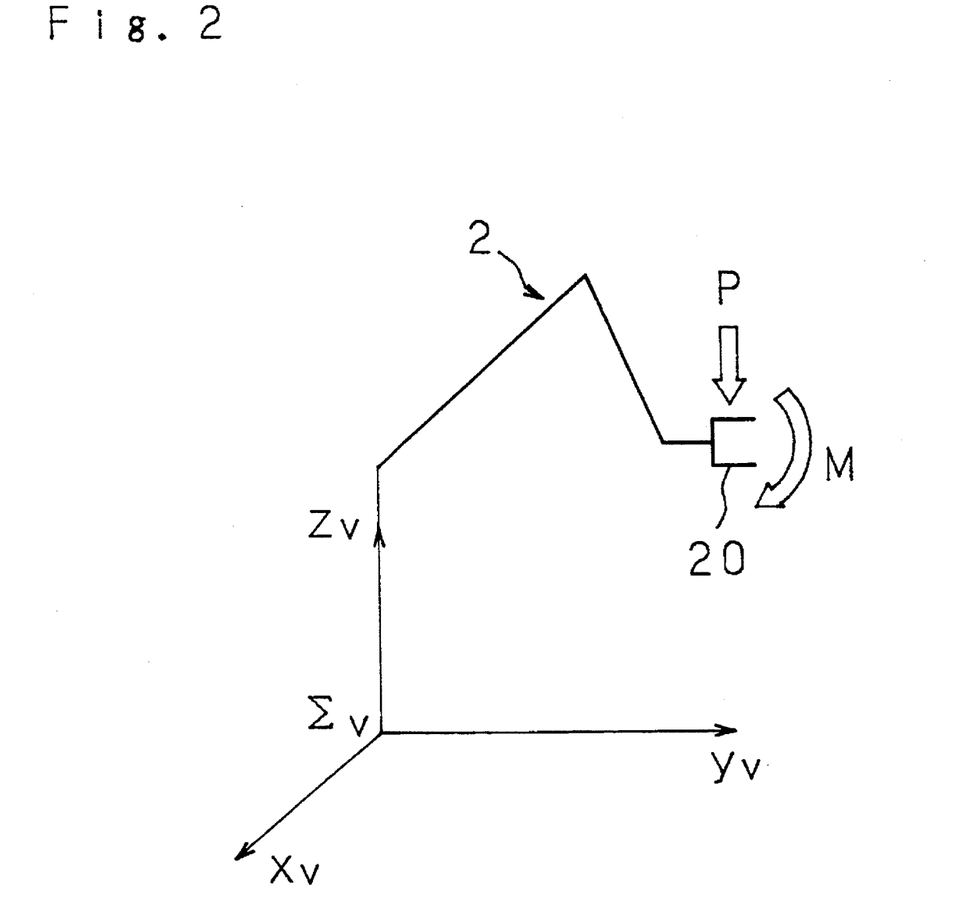
FIG. 2 is a diagram depicting the static forces on a manipulator of the mobile robot.

The static forces on the manipulator 2 will now be discussed in reference to FIG. 2. FIG. 2 shows external force P acting downward on the end effector 20 and the external moment M acting around the end effector 20. In FIG. 2, manipulator 2 is represented by a simplified shape.

The external force P and the external moment M acting on the manipulator 2 as indicated in FIG. 2 are expressed by matrix (7) and matrix (8), respectively;

$$P = \begin{pmatrix} P_x \\ P_y \\ P_z \end{pmatrix} \qquad (7)$$

where P: external force
$P_x$: x-axis component of external force
$P_y$: y-axis component of external force
$P_z$: z-axis component of external force $$M = \begin{pmatrix} M_x \\ M_y \\ M_z \end{pmatrix} \qquad (8)$$

where M: moment of external force
$M_x$: x-axis component of moment of external force
$M_y$: y-axis component of moment of external force
$M_z$: z-axis component of moment of external force The relationship between the matrix $\tau=[\tau_1, \tau_2, \tau_3, \tau_4, \tau_5, \tau_6]^T$ indicating the torque generated at each revolute joint of the manipulator 2 and the matrix $q=[q_1, q_2, q_3, q_4, q_5, q_6]^T$ representing the angle of each of the revolute joints of the manipulator 2 will now be obtained by employing the principle of virtual work.

The work $W_1$ applied to the manipulator 2 by the external force P and the external moment M is represented by expression (10) when the vector showing the displacement of the position and attitude of the end effector 20 (relative to the moving coordinate system) due to the external force P and the external moment M satisfies equation (9);

$$^vdr_H = [{^vdr_{HF}}^T, {^vdr_{HO}}^T]^T \qquad (9)$$

where $^vdr_H$: vector of displacement of position and attitude end effector $$W_1 = {^vdr_H}^T \begin{pmatrix} P \\ M \end{pmatrix} \qquad (10)$$

where the superscripted T indicates a transposed matrix.

Furthermore, if the revolute joints are rotated by an angle dq due to the external force and the torque, the work $W_2$ within the manipulator 2 is represented by expression (11);

$$W_2 = dq^T \tau \qquad (11)$$

In accordance with static theory, since the work $W_1$ expressed by expression (10) is equal to the work $W_2$ shown by expression (11), equation (12) will hold;

$$^vdr_H^T \begin{pmatrix} P \\ M \end{pmatrix} = dq^T \tau \qquad (12)$$

The equation (12) can be transformed into equation (13) by applying equation (6);

$$({^vJ(q)}dq)^T \begin{pmatrix} P \\ M \end{pmatrix} = dq^T \tau \qquad (13)$$

The torque generated at each revolute joint when the external force P and the external moment M operate on the end effector 20 is represented by expression (14), obtained through algebraic manipulation of equation (13).

$$\tau = {^vJ(q)}^T \begin{pmatrix} P \\ M \end{pmatrix} \qquad (14)$$

Figure 3:
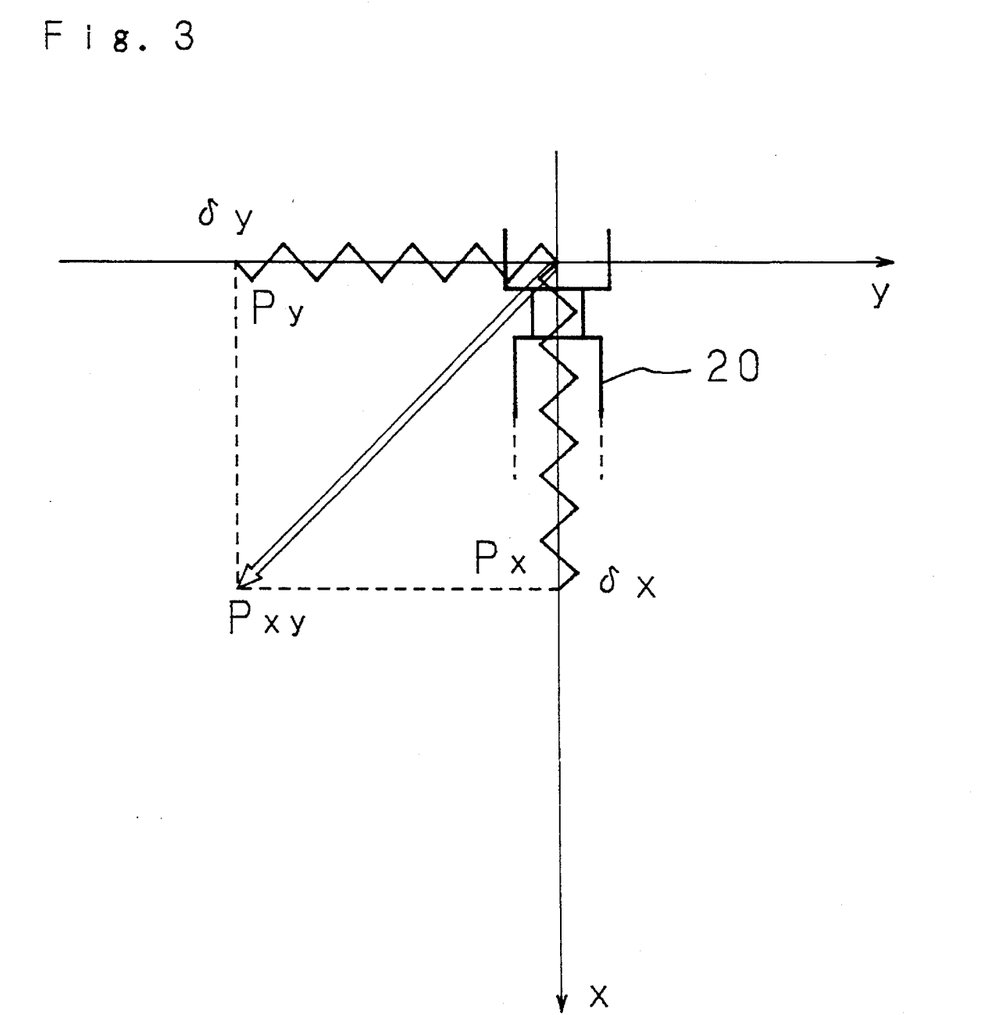
FIG. 3 is a diagram depicting the external forces acting on an end effector of the manipulator in the x-y plane.

The operation of external force $P_{xy}$ within the horizontal plane (hereinafter referred to as the x-y plane) will now be described. FIG. 3 is a diagram depicting the action of the external force $P_{xy}$ in the x-y plane, showing external force $P_{xy}$ resolved into components, an external force $P_x$ in the x-axis direction and an external force $P_y$ in the y-axis direction, when pulling the end effector 20 in a predetermined direction.

Assuming that the external forces $P_x$ and $P_y$ can be modelled as resulting from the extension of a spring, the external force $P_{xy}$ can be represented as expression (15);

$$P_{xy} = \begin{pmatrix} P_x \\ P_y \end{pmatrix} = \begin{pmatrix} k\delta_x \\ k\delta_y \end{pmatrix} = k \begin{pmatrix} \delta_x \\ \delta_y \end{pmatrix} \qquad (15)$$

where $\delta_x$ is the extension of the spring in the x-axis direction, $\delta_y$ is the extension of the spring in the y-axis direction and k is a spring constant.

The matrix $\tau$ showing the torque obtained by substituting the external force $P_{xy}$ in expression (14) indicates the torque needed at each revolute joint 21 of the manipulator 2 to generate the external force $P_{xy}$ on the whole.

Figure 4:
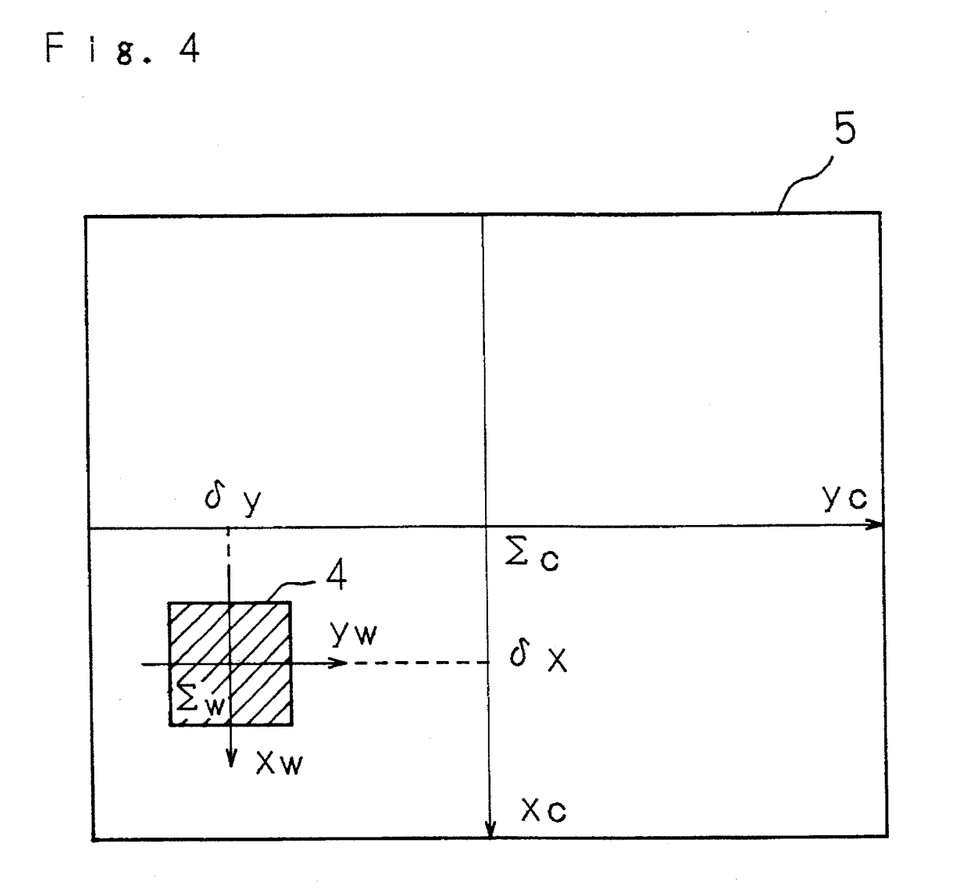
FIG. 4 is a diagram depicting a camera-centered coordinate system.

The method of controlling the position of the end effector 20 of the manipulator 2 by use of the camera 3 will now be explained. FIG. 4 is a diagram depicting camera-centered coordinate system $\Sigma_C$. The origin of the camera-centered coordinate system $\Sigma_C$ is the center of a region imaged by camera 3. The x and y axes of the camera-centered coordinate system determine an imaging plane of camera 3. Assuming that the camera-centered coordinate system $\Sigma_C$ is overlayed on a monitor screen 5 for displaying an image captured by the camera 3. In the camera-centered coordinate system $\Sigma_C$, the position of the work-centered coordinate system $\Sigma_W$ (workpiece 4) seen from the camera-centered coordinate system $\Sigma_C$ is indicated by a transposed matrix $(\delta_x, \delta_y)^T$.

Figure 5:
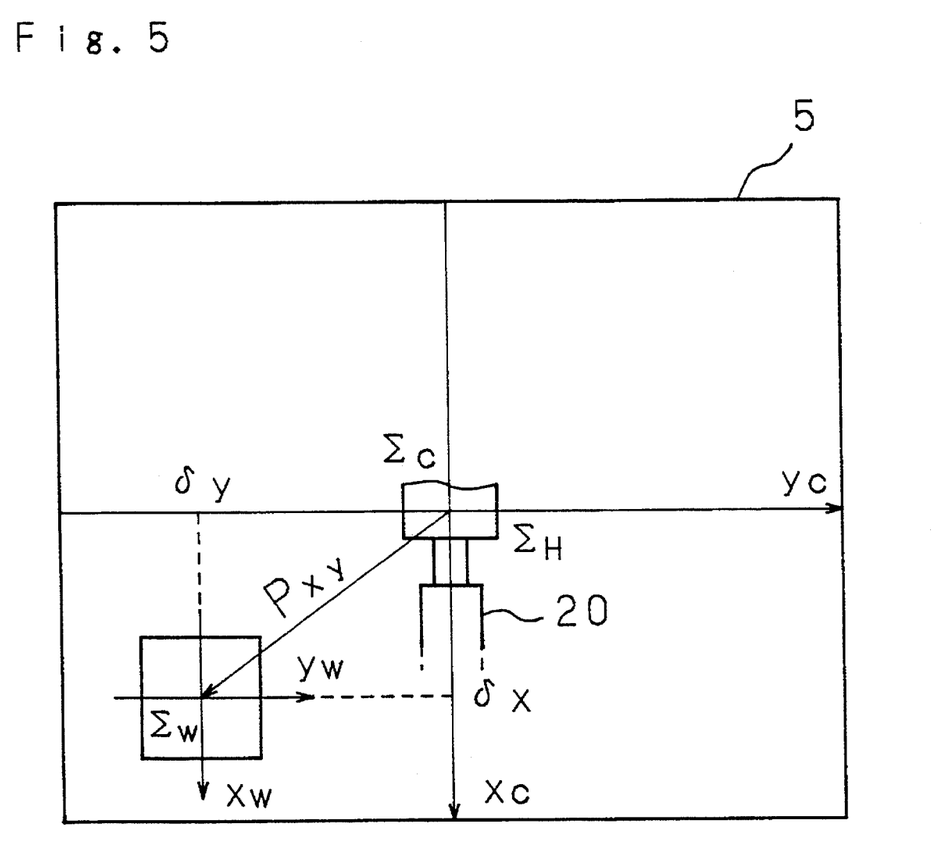
FIG. 5 is a diagram depicting the camera-centered system when the coordinate axes of a hand-centered coordinate system coincide with those of the camera-centered coordinate system.

FIG. 5 is a diagram depicting the camera-centered coordinate system when the coordinate axes of the hand-centered coordinate system coincide with those of the camera-centered coordinate system. If the camera 3 is positioned so as to make the coordinate axes of the camera-centered coordinate system $\Sigma_C$ agree with those of the hand coordinate system $\Sigma_H$, the positional displacement of the workpiece 4 from the end effector 20 indicates a position $(\delta_x, \delta_y)_T$ of the workpiece-centered coordinate system $\Sigma_W$ relative to the camera-centered coordinate system $\Sigma_C$. The external force $P_{xy}$ of expression (15) acts in a direction indicated in FIG. 5. The matrix $\tau$ of expression (14) is the torque required at each revolute joint of the manipulator 2 to bring the end effector 20 closer to the workpiece 4 by applying force equivalent to the external force $P_{xy}$.

If the camera 3 is able to measure not only $\delta_x$ and $\delta_y$, but also the arbitrary deviation of the position and attitude from the target position and attitude, the position and attitude of the end effector 20 can be corrected to the target position and attitude by employing the above-described principles. When a vector representing the deviation of the position and attitude of the end effector 20 seen from the camera-centered coordinate system $\Sigma_C$, as derived from image data obtained from the camera 3, is represented by expression (16), the matrix $\delta$ of the torque to be generated at each revolute joint of the manipulator 2 is given by equation (17) which incorporates expression (14);

$$\delta x = \begin{pmatrix} \delta x \\ \delta y \\ \delta z \\ \delta \rho \\ \delta \theta \\ \delta \phi \end{pmatrix} \quad (16)$$

where $\delta X$: vector of deviation of position and attitude obtained from picture by camera $$\tau = K \, ^v J(q)^T \delta X \quad (17)$$

where K: diagonal matrix to determine a spring constant in direction of each deviation The control law of the manipulator 2 will now be discussed. All the revolute joints of the manipulator 2 are driven via a servo system including servo motors described earlier. A vector V indicative of the supply voltage to the servo system driving the revolute joints is calculated with equation (18) which incorporates equation (17) (to eliminate the deviation of the position and attitude of the end effector 20 determined from the image data obtained by the camera 3) with the fundamental control law of the servo system;

$$V = K_1 (q_d^i - q^i) + K_2 \, ^v J(q^i)^T \delta X^i \quad (18)$$

where $K_1$, $K_2$: control gain $\delta X^i$: vector of position and attitude of end effector from camera coordinate system In equation (18), the first term on the right side shows the positional feedback for each revolute joint as derived from an instructed target value of the revolute joint angle. This first term is obtained by multiplying the deviation between the target revolute joint angle vector and the actually measured revolute joint angle vector by a predetermined control gain. The second term on the right side of equation (18) indicates the compensation of the revolute joints derived from the image data captured by the camera 3, which is obtained by multiplying the above-described Jacobian matrix by the vector of the position and attitude deviation of the end effector 20 relative to the camera-centered coordinate system $\Sigma_C$ and by a predetermined control gain. In other words, the equation (18) is a control law which simultaneously implements positional feedback in accordance with the first term on the right side and position and attitude compensation in accordance with the second term on the right side.

However, the position and attitude of the end effector 20 resulting from control in accordance with the first term on the right side of the equation (18) includes an error resulting from an error in the position and attitude of the mobile robot. This error in the position and attitude of the end effector 20 is represented by the vector of the position and attitude deviation of the end effector 20, that is, the second term on the right side of the expression (18). However, performing positional feedback in accordance with both the first term on the right side of the expression (18) and the second term on the right side simultaneously results in disharmony, which as explained below is not easily avoided.

To avoid the above disharmony between the first term and the second term of the right side of equation (18), it would be possible to omit the first term on the right side causing the position and attitude error. In this case, however, all components of the vector $\delta_x^i$ in the second term on the right side must be accurately obtained, that is, accurate three-dimensional visual recognition is necessary.

However, such three-dimensional visual recognition is not practically feasible. Instead, the invention takes advantage of the fact that feedback of the position and attitude deviation components relative to all the axes of the workpiece-centered coordinate system $\Sigma_W$ is unnecessary in some cases. For the end effector of the invention, the positional deviation along the z-axis and the attitude deviation about the x-axis and y-axis in the vector $\delta_x^i$ are supposed to be zero, since it is assumed that the mobile robot moves only within the x-y plane of the work coordinate system $\Sigma_W$, the roughness of the running surface of the carriage 1 and the deflection of the link and reduction gear are negligible, and that the gravity influences are already compensated. Therefore, the camera 3 is restricted to capture an image in the vertical downward direction at all times, thus making it possible to correctly measure the positional deviation along the x-axis and y-axis and the attitude deviation about the z-axis from the two-dimensional image obtained by the camera 3.

Thus, the positional deviation along the x-axis and y-axis and the attitude deviation about the z-axis should be controlled (in accordance with the second term on the right side of the equation (18)) through camera feedback (feedback of data from the camera 3) and the other deviations should be controlled (in accordance with the first term on the right side of the equation (18)) through feedback of the position and attitude.

The following disharmony presents itself, however. When the control gain $K_1 \neq 0$ while the control gain $K_2 = 0$ in the equation (18), the equation (18) represents the control system itself through the position and attitude feedback, therefore the end effector 20 is controlled to stop at the origin of the hand-centered coordinate system $\Sigma_H$ in FIG. 5. On the other hand, when the control gain K1=0 while the control gain K2≠0, the end effector 20 is controlled to move to the origin of the workpiece-centered coordinate system $\Sigma_W$. Therefore, when both the control gains K1, K2 assume nonzero values, the end effector 20 is controlled to stop between the origin of the hand-centered coordinate system $\Sigma_H$ and the origin of the workpiece-centered coordinate system $\Sigma_W$, but not at the origin of the workpiece-centered coordinate system $\Sigma_W$.

Since a control law which simply omits the first term on the right side of equation (18) does not properly position the end effector 20, this invention shares the control between the first and second terms on the right side. The target revolute joint angle in the first term on the right side of the expression (18) is derived from a vector ${}^W r_{Hd}{}^i$ indicating the target position and attitude of the end effector 20 relative to the workpiece-centered coordinate system $\Sigma_W$. More specifically, the target position and attitude is obtained through calculating the vector ${}^W r_H{}^i$ showing the position and attitude that the end effector 20 should assume while considering the position and attitude of the carriage 1 of the mobile robot, then transforming the expression (4) inversely.

Therefore, in accordance with the first term on the right side of the equation (18), the position in the z-axis direction of the workpiece-centered coordinate system $\Sigma_W$ and the attitude of the end effector 20 are controlled but the positions in the x-axis and y-axis directions of the workpiece-centered coordinate system $\Sigma_W$ are not controlled. That is, control by the first term on the right side has no effect on the target values of the positions in the x-axis and y-axis directions. In other words, the control is shared by controlling the position along the z-axis direction of the workpiece-centered coordinate system $\Sigma_W$ and the attitude of the end effector 20 in accordance with the first term on the right side, while controlling the positions in the x-axis and y-axis directions of the workpiece-centered coordinate system $\Sigma_W$ in accordance with the second term on the right side, thus eliminating the disharmony.

How the invention actually shares control between the first and second terms on the right side will now be discussed. The homogeneous transformation matrix showing the position and attitude of the end effector 20 in the workpiece-centered coordinate system $\Sigma_W$ at the time it can be obtained in a prescribed manner, with respect to the matrix $q^i$ indicating the angle of each revolute joint 21 of the manipulator 2 at a time it and the homogeneous transformation matrix of the position and direction of the carriage 1 in the absolute coordinate system $\Sigma_S$ at the time iτ. With respect to this result the vector ${}^W r_H{}^i$ indicating the target position and attitude of the end effector 20 in the workpiece-centered coordinate system $\Sigma_W$ at the time it is obtained in a prescribed manner.

If a condition that the vector ${}^W r_H{}^i$ is equal to the vector ${}^W r_{Hd}{}^i$ is met the matrix $q^i$ becomes equal to the matrix $q_d{}^i$ and the first term on the right side of the equation (18) has no value, which is equivalent to omitting the first term on the right side. Accordingly, the desired control sharing is realized if ${}^W r_x{}^i$ and ${}^W r_y{}^i$ which are the x-axis and y-axis components of the vector ${}^W r_H{}^i$ are substituted for ${}^W r_{xd}{}^i$, ${}^W r_{yd}{}^i$ which are the x-axis and y-axis components of the vector ${}^W r_{Hd}{}^i$ so as to make the former components equal to the latter components at all times.

A vector $p^W r_{Hd}{}^i$ indicating a target position and attitude of the end effector 20 relative to the workpiece-centered coordinate system $\Sigma_W$ adjusted for the desired control sharing between the first and second terms on the right side of the equation (18) is obtained with equation (19):

$$p^W r_{Hd}^{i} = \begin{pmatrix} 0 & & & & \phi \\ & 0 & & & \phi \\ & & 1 & & \\ & & & 1 & \\ & \phi & & & 1 \\ & & & & & 1 \end{pmatrix} {}^W r_{Hd}^{i} + \begin{pmatrix} 1 & & & & \phi \\ & 1 & & & \phi \\ & & 0 & & \\ & & & 0 & \\ & \phi & & & 0 \\ & & & & & 0 \end{pmatrix} {}^W r_H^{i} \quad (19)$$

The first matrix in the second term on the right side of equation (19) is referred to as a switching matrix S. Control is not performed for directions where 1 is held in the appropriate position of the switching matrix. For example, the switching matrix S for obtaining the vector $p^W r_{Hd}{}^i$ in equation (19) where the attitude of the end effector is not controlled will be represented by the following expression (20):

$$S = \begin{pmatrix} 0 & & & & \\ & 0 & & & \phi \\ & & 0 & & \\ & & & 1 & \\ & \phi & & & 1 \\ & & & & & 1 \end{pmatrix} \quad (20)$$

When equation (19) is expressed in terms of the switching matrix S, equation (21) results:

$$p^W r_{Hd}^{i} = (E-S)^W r_{Hd}^{i} + S^W r_H^{i} \quad (21)$$

where E: unit matrix

The vector V indicating the supply voltage to the servo system for driving the revolute joints of the manipulator 2 is obtained from equation (22). In equation (22), the target revolute joint angle of the manipulator 2 obtained on the basis of the vector $p^W r_{Hd}{}^i$ is represented by a matrix ${}_p q_d{}^i$. Control for directions not controlled by the first term on the right side of the expression (18) is accomplished by the second term on the right side:

$$V = K_1 ({}_p q_d^{i} - q^{i}) + K_2 {}^V J(q^{i})^T S \delta x^1 \quad (22)$$

In the first term on the right side of equation (22), the deviation between the adjusted target revolute joint angle indicated by the matrix ${}_p q_d{}^i$ obtained as above and the actually measured revolute joint angle is multiplied by a predetermined control gain, wherein only the position in the z-axis direction of the workpiece-centered coordinate system $\Sigma_W$ and the attitude of the end effector are controlled. In the second term on the right side, the Jacobian matrix is multiplied by the vector indicating the position and attitude deviation of the end effector 20 seen from the camera-centered coordinate system $\Sigma_C$, by the switching matrix S for controlling only the positions in the x-axis and y-axis directions of the workpiece-centered coordinate system $\Sigma_W$, and by a predetermined control gain, wherein the positions of the end effector 20 are controlled only in the x-axis and y-axis directions of the workpiece-centered coordinate system $\Sigma_W$. In other words, equation (22) is the control law that harmonizes the control of position in the z-axis direction of the workpiece-centered coordinate system $\Sigma_W$ and the attitude in accordance with the first term on the right side and the control of the positions in the x-axis and y-axis directions of the workpiece-centered coordinate system $\Sigma_W$ in accordance with the second term on the right side.

Figure 6:
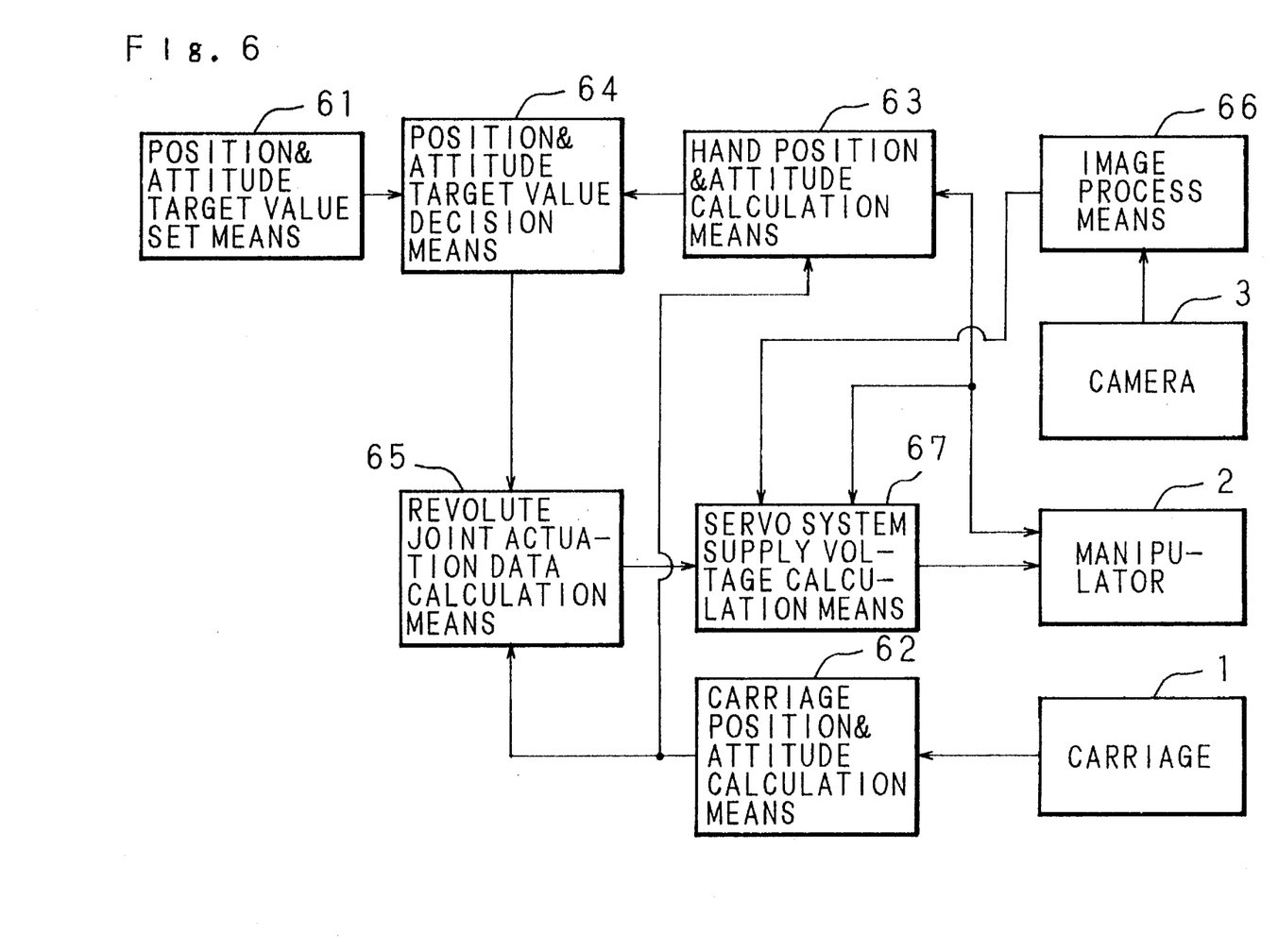
FIG. 6 is a block diagram of a control system in accordance with the invention for controlling the position and attitude of the end effector.

The structure of the system for controlling the position and attitude of the manipulator 2 in accordance with the invention will now be discussed. FIG. 6 is a block diagram of this control system.

In FIG. 6, a position and attitude target value set means 61 sets a target value of the position and attitude of the end effector 20 in the workpiece-centered coordinate system $\Sigma_W$, and supplies the set data to a position and attitude target value decision means 64.

A carriage position and attitude calculation means 62 calculates the current position and attitude of the carriage 1 based on the running state of the carriage 1, and supplies the calculated data to a hand position and attitude calculation means 63 and a revolute joint actuation data calculation means 65. The hand position and attitude calculation means 63 calculates the current position and attitude of the end effector 20 on the basis of the detected current revolute joint angles of the manipulator 2 and the detected position and attitude of the carriage 1 supplied by the carriage position and attitude calculation means 62. The hand position and attitude calculation means 63 supplies the current position and attitude to the position and attitude target value decision means 64.

The position and attitude target value decision means 64 applies equation (21) to derive the adjusted target value used to control the position and attitude of the end effector 20 from the target position and attitude data set by the position and attitude target value set means 61 and the current position and attitude data calculated by the hand position and attitude calculation means 63. The position and attitude target value decision means 64 supplies the decided adjusted target value to the revolute joint actuation data calculation means 65.

The revolute joint actuation data calculation means 65 applies equation (4) to calculate the target angle of each revolute joint of the manipulator necessary to match the position and attitude of the end effector 20 to the target value supplied by the position and attitude target value decision means 64, taking into account the position and attitude data of the carriage 1 supplied by the carriage position and attitude calculation means 62. The target joint angle data is supplied to a servo system supply voltage calculation means 67.

The image data captured by the camera 3 is supplied to an image process means 66 which processes the image data captured by the camera 3 to obtain the deviation of the position and attitude of the end effector 20 relative to the camera-centered coordinate system $\Sigma_C$, and supplies the deviation data to the servo system supply voltage calculation means 67.

In addition to the above-described data, the measured angle of each revolute joint of the manipulator is supplied to the servo system supply voltage calculation means. The servo system supply voltage calculation means 67 calculates the supply voltage to the servo system from the actually measured angle of each revolute joint, the target revolute joint angle data from the revolute joint actuation data calculation means 65 and the deviation data for the position and attitude of the end effector 20 obtained from the image process means 66. The calculated data is supplied to the servo system of the manipulator 2.

The manipulator 2 is operated by the control system described above with the supply voltages being calculated by the servo system supply voltage calculation means 67.

In the control method of this invention, the angle of each revolute joint of the manipulator 2 is controlled by harmonizing two methods, a first method which relies on the image data captured by the camera 3 and a second method which relies on the target values of the angle of each revolute joint 21 of the manipulator 2. The image data showing the real-time horizontal position and attitude of the end effector is included in the control of the revolute joint angle, thereby effectively controlling the position and attitude of the manipulator 2 in relation to the relatively moving workpiece 4.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. In a manipulator including an end effector having a position and an attitude in a workpiece-centered coordinate system having an origin within a workpiece, a method of controlling the position to be a target position and the attitude to be a target attitude, said method comprising the steps of:

(A) using a camera mounted on the manipulator to capture an image of the end effector and supply image data to an image processor, wherein a camera-centered coordinate system is defined in which a z-axis is coincident with an imaging direction of the camera and an x-axis and a y-axis are orthogonal to one another and to the z-axis;

(B) using the image processor to calculate from the image data a current position of the end effector relative to the x-axis and y-axis of the camera-centered coordinate system;

(C) using target value set means to accept input indicating the target position and the target attitude of the end effector;

(D) using hand position and attitude calculation means to determine a current position and attitude of the end effector in the workpiece-centered coordinate system;

(E) using decision and calculation means coupled to the image processor, to the hand position and attitude calculation means, and to the target value set means to set voltage inputs to servos controlling a plurality of revolute joints of the manipulator to control the end effector to have the target attitude and the target position; and (F) using the decision and calculation means to adjust the voltage inputs to control the position of the end effector along an x-axis and a y-axis of the workpiece-centered coordinate system responsive to input from the image processor, and to control the position of the end effector along a z-axis of the workpiece-centered coordinate system and the attitude of the end effector in the workpiece-centered coordinate system responsive to input from said target value set means and hand position and attitude calculation means, wherein said x-axis and said y-axis are orthogonal to one another and to said z-axis.

2. The method of claim 1 wherein said (F) step comprises the substeps of:

using the decision and calculation means to substitute the current position of the end effector along the x-axis and y-axis of the workpiece-centered coordinate system for the target position of the end effector along the x-axis and y-axis of the workpiece-centered coordinate system to obtain an adjusted target position and attitude of the end effector; thereafter using the decision and calculation means to derive target angles for the plurality of revolute joints of the manipulator arm from the adjusted target position and attitude of the end effector; and using the decision and calculation means to calculate the servo voltages as a vector sum of a first term derived from the adjusted target position and attitude of the end effector and a second term derived from the current position of the end effector relative to the x-axis and y-axis of the camera-centered coordinate system.

3. In an end effector position and attitude control system including an end effector of a manipulator, the end effector having a position and an attitude in a workpiece-centered coordinate system having an origin within a workpiece, a camera, an image processor, target value set means, hand position and attitude calculation means, and decision and calculation means coupled to the camera, to the image processor, to the target value set means, and to the hand position and attitude calculation means, a method of controlling the position to be a target position and the attitude to be a target attitude, said method comprising the steps of:

(A) capturing, using the camera, an image of the end effector, and supplying resulting image data to the image processor, wherein a camera-centered coordinate system is defined in which a z-axis is coincident with an imaging direction of the camera and an x-axis and a y-axis are orthogonal to one another and to the z-axis;

(B) calculating from the image data, using the image processor, a current position of the end effector relative to the x-axis and y-axis of the camera-centered coordinate system;

(C) accepting, using the target value set means, input indicating a target position and a target attitude of the end effector in the workpiece-centered coordinate system;

(D) determining, using the hand position and attitude calculation means, a current position and a current attitude of the end effector in the workpiece-centered coordinate system;

(E) setting, using the decision and calculation means, voltage inputs to servos controlling a plurality of revolute joints of the manipulator to control the end effector to have the target attitude and target position; and (F) adjusting, using the decision and calculation means, the voltage inputs to control the position of the end effector along an x-axis and a y-axis of the workpiece-centered coordinate system responsive to input from the image processor, and to control the position of the end effector along a z-axis of the workpiece-centered coordinate system and the attitude of the end effector in the workpiece-centered coordinate system responsive to input from said target value set means and hand position and attitude calculation means.

4. The method of claim 3 wherein said (F) step comprises the substeps of:

substituting, using the decision and calculation means, the current position of the end effector along the x-axis and y-axis of the workpiece-centered coordinate system for the target position of the end effector along the x-axis and y-axis of the workpiece-centered coordinate system to obtain an adjusted target position and attitude of the end effector; thereafter deriving, using the decision and calculation means, target angles for the plurality of revolute joints of the manipulator arm from the adjusted target position and attitude of the end effector; and calculating, using the decision and calculation means, the servo voltages as a vector sum of a first term derived from the adjusted target position and attitude of the end effector and a second term derived from the image data.

* * * * *